Nov. 5, 1963
P. A. MORGAN
3,109,598
LAMP FOR VEHICLE
Filed Aug. 14, 1961
2 Sheets-Sheet 1
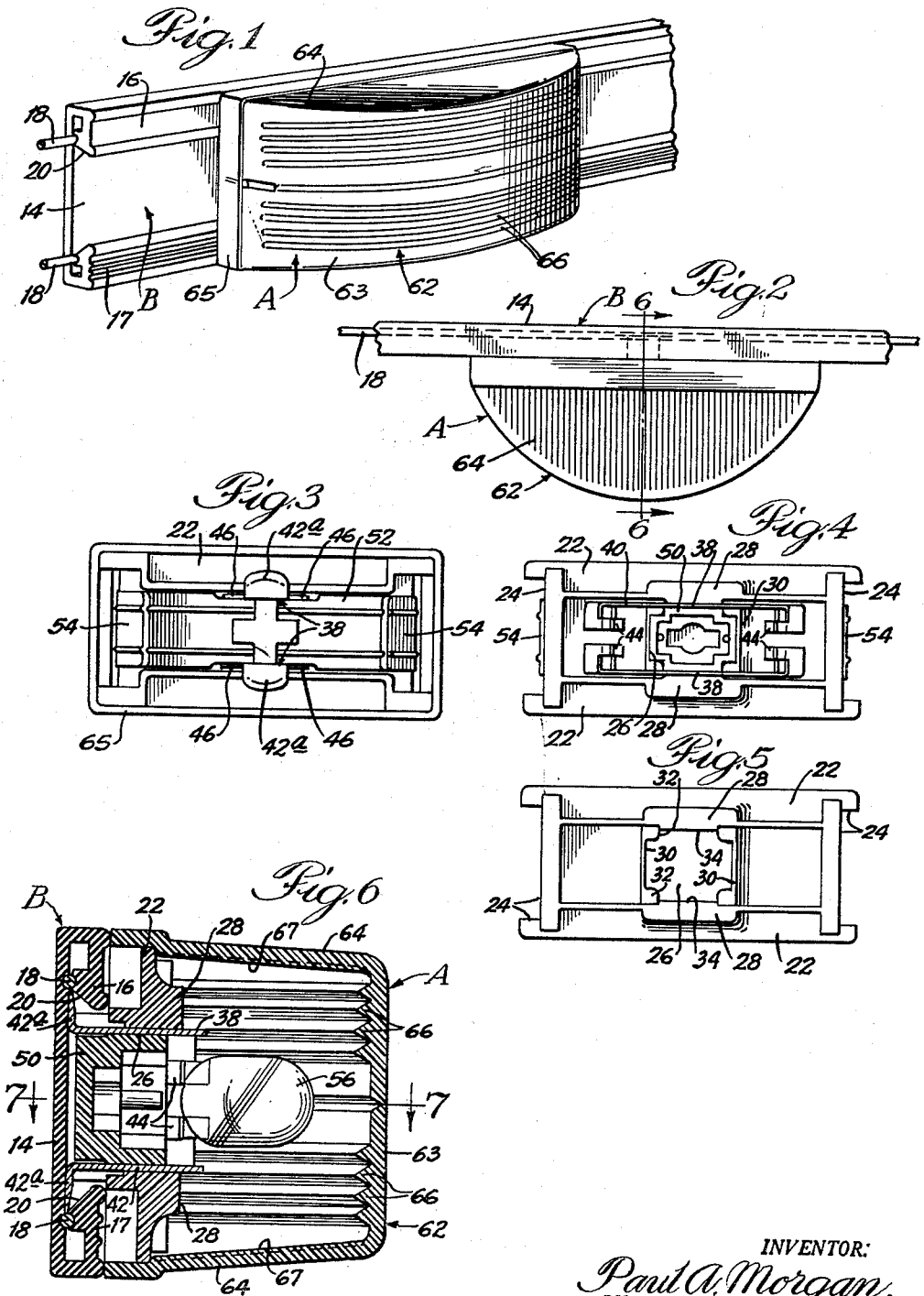
INVENTOR:
Paul A. Morgan,
BY
Bair, Freemont & Molinare
ATTORNEYS.

Nov. 5, 1963  P. A. MORGAN  3,109,598
LAMP FOR VEHICLE
Filed Aug. 14, 1961  2 Sheets-Sheet 2
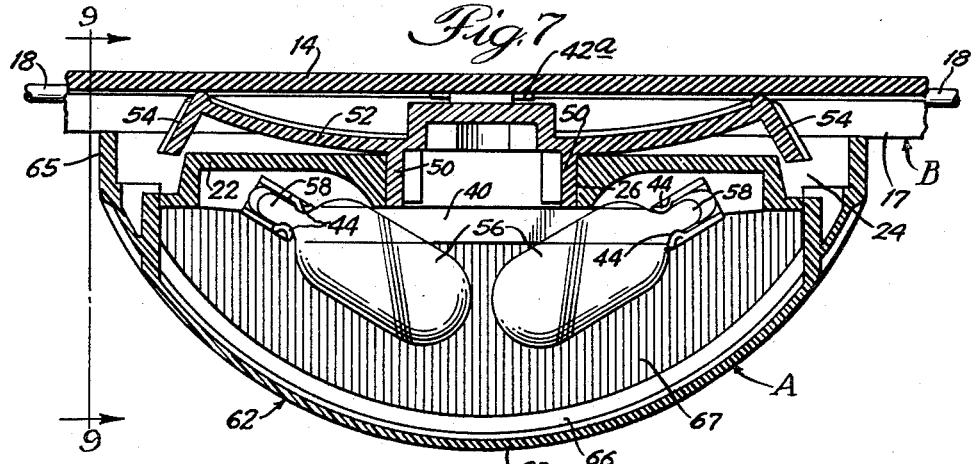
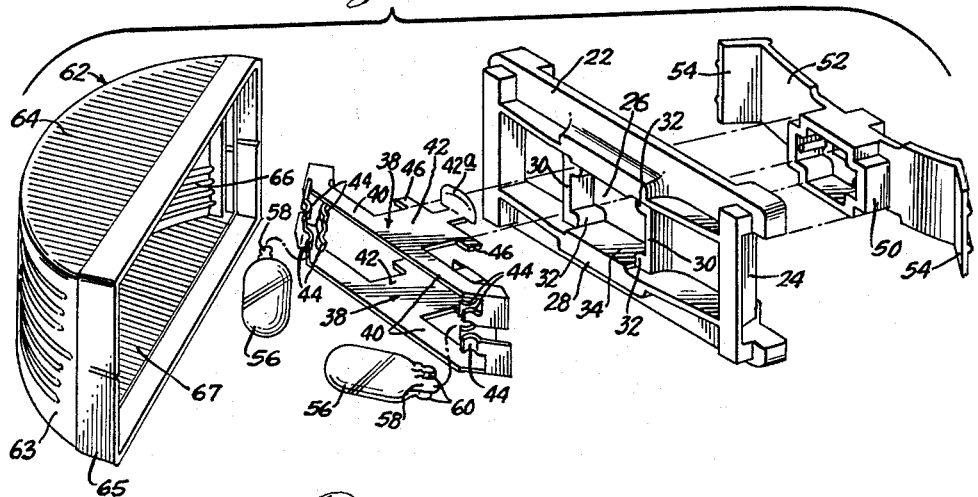
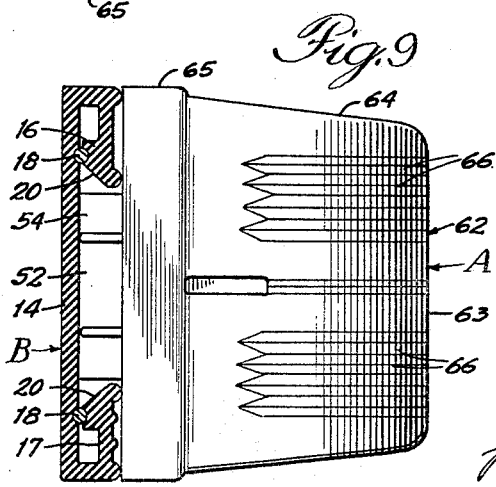
INVENTOR:
Paul A. Morgan,
BY
Bair, Freeman & Molinare
ATTORNEYS.

United States Patent Office
3,109,598
Patented Nov. 5, 1963

3,109,598
LAMP FOR VEHICLE
Paul A. Morgan, Chicago, Ill., assignor to King Bee Manufacturing Co., Bellwood, Ill., a corporation of Illinois
Filed Aug. 14, 1961, Ser. No. 131,375
9 Claims. (Cl. 240—8.2)

This invention relates to a light unit for use with a conductor strip of the type sometimes referred to as a "bus bar." While the light unit is capable of numerous uses, it is particularly suitable for use in a vehicle lighting system in the nature of identification and clearance lights for road vehicles such as trucks, trailers, semi-trailers and buses.

Highway vehicles, such as trucks, trailers, semi-trailers and buses, must comply with the rigid lighting requirements of the Interstate Commerce Commission. This commission has established definite and rigid regulations as to the lighting of such vehicles, and which must be strictly observed by the vehicle operator. Among the requirements for lighting of such vehicles are specific designations as to size and locations of both identification and clearance lights. Such lights as heretofore used are generally of the type including an electric lamp bulb mounted in a socket, attached to a base or mounting, with a housing including a lens for enclosing the lamp bulb. Normally, when such lamp bulbs burn out, or when the light unit has become damaged while the vehicle is in transit, it is usually difficult and inconvenient to replace said bulbs or units. This situation exists because lamp bulbs for specific types of lamps, and complete light units, are not always obtainable, along with the services of a mechanic, at most service stations along the highways. It is, therefore, highly desirable that light units used for identification and clearance lights be of such form and character as will permit an operator to quickly and easily mount an additional light unit in position without the necessity for calling upon special mechanics, which would delay movement of the vehicle.

One of the objects of this invention is to provide a novel light unit which may be quickly and easily mounted in operative relation on a conductor strip without requiring the use of any tools.

Another object is to provide a novel light unit for cooperative use and engagement with a conductor strip, and wherein the light unit is caused to be securely latched to the conductor strip in a manner to preclude its removal intact, and which requires destruction of parts thereof in order to permit removal of the unit from the strip.

A further object is to provide an improved light unit for cooperative use and engagement with a conductor strip and which may be quickly and simply installed by initially placing the unit at approximately right angles to the conductor strip, and then rotating the unit approximately 90°, at which time the unit becomes operatively attached to the strip and the lighting circuit, and becomes securely latched in place so as to preclude its removal, except by breakage.

Still another object is to provide an improved light unit which is extremely simple in construction, durable in use, composed of relatively few parts, and which is inexpensive to manufacture—and by virtue of which it is economically practical to completely discard and totally replace the light unit when any parts thereof become worn out or damaged.

Other objects and advantages of this invention will be apparent from the following description taken in connection with the accompanying drawings, in which:

FIGURE 1 is a perspective view of a novel light unit shown mounted in operative relation to a section of the conductor strip;

FIGURE 2 is a plan view of the light unit and conductor strip seen in FIGURE 1;

FIGURE 3 is a bottom plan view of an assembled light unit, embodying the invention;

FIGURE 4 is a top plan view of the base and associated parts of the light unit, with the cover and lamp bulbs removed;

FIGURE 5 is a view similar to FIGURE 4 showing the base unit per se;

FIGURE 6 is an enlarged, vertical sectional view through the light unit, shown mounted in operative relation to the conductor strip, and taken substantially as indicated at line 6—6 on FIGURE 2;

FIGURE 7 is an enlarged, horizontal sectional view taken as indicated at line 7—7 on FIGURE 6;

FIGURE 8 is an exploded view showing in perspective all of the separate elements of the total light unit;

FIGURE 9 is a view in side elevation of the light unit, with the conductor strip in section, taken as indicated at line 9—9 on FIGURE 7.

The light unit of the present invention represents certain refinements and improvements in light units of the general type disclosed in my co-pending application, Serial No. 61,512, filed October 10, 1960.

The light unit of the present invention, indicated generally at A, is adapted for use in connection with a conductor strip, such as represented generally at B. When the light unit is to be utilized as an identification or clearance light for vehicles, the appropriate length of conductor strip B is secured to the external surface of the body of the vehicle, and is suitably connected to a source of electrical energy, such as a battery. The use of a proper number, location and color of the lenses or housing portions of the light units must necessarily comply with the requirements of the Interstate Commerce Commission.

The conductor strip B, as seen in the drawings, is a flat, tape-like member formed of plastic, insulating material, and having a flat web portion 14, formed with suitable openings along its length for the reception of screws or similar fastening members for securement of the strip to its mounting, such as the body of a vehicle. The top and bottom portions of the web 14 extend into reversely bent flanges 16 and 17, and embedded between the front surface of the web and the inner surface of the flanges are conductor wires 18. If desired, the conductor strip could be formed of metal, in which case the conductors, per se, would be individually insulated from the metal. The inner edges of the flanges 16 and 17 are undercut, as indicated at 20, and which undercut extends substantially to the conductor wires 18. By virtue of this arrangement the prongs or contact lugs on the lighting unit, as hereinafter described in detail, may conveniently engage and make contact and complete the electrical circuit with the conductor wires.

The light unit A comprises a flat, rectangular mounting base 22, preferably molded of plastic material, having electrical insulating characteristics, and the opposite ends of the base are provided with recesses or notches 24. The central portion of the base is formed with a relatively large, generally rectangular shaped opening 26, and at opposite edges of the opening (the top and bottom as seen in FIGURE 5) there is provided upstanding ribs 28, and the sides of the opening are surrounded by upstanding ribs 30. In each corner of the opening 26, there is provided an inwardly extending lug, as indicated at 32; and between each pair of lugs (at top and bottom of the base, as seen in FIGURE 5), a channel 34 is defined—and which channels accommodate the depending legs of contact members hereinafter described.

Mounted in cooperating relation to the base 22, are a pair of identical contact members 38, formed as sheet metal stampings. As seen in FIGURE 8 of the drawings, these contact members are generally in the form of a T, and each include a pair of oppositely extending arms 40, and a central leg 42 extending at right angles to the arms. The outer ends of each of the arms 40 are formed to provide a pair of spaced apart, resilient contact fingers 44, as seen in FIGURE 8 of the drawings. The two contact members are mounted in spaced apart relation, as sen in FIGURE 4 of the drawings, with the respective sets of fingers at corresponding ends positioned in close, spaced apart, substantially aligned relation, so as to define a slot-type socket. Each of the contact members is mounted in operative relation to the base, with the leg portion 42 seated in a channel 34 in the base, and with a pair of laterally extending lugs 46 on said leg, extending beneath the corner lugs 32 of the base, as seen in FIGURE 3 of the drawings, and with the portions of the arms 40 resting upon the upper surfaces of said lugs 32. The contact members are so dimensioned as to provide a snug fitting relation to the base. As may be seen in FIGURES 7 and 8, the sets of resilient fingers at the ends of the arms 40 are positioned so that the slot formed therebetween extends in an inclined direction toward each other.

By reason of the two contact members being of identical form, economy is effected in the manufacture of said contact members, and economy is further effected in that said members, being identical, facilitate the assembly with the base.

After the contact members are mounted in position in the base, a plug member 50 of substantially the identical contour of the opening 26 in the base is then forced into the opening and firmly engages the inner surfaces of the legs 42 of the contact members, and firmly and securely locks the contact members in proper relation to the base. The plug 50 desirably is formed of suitable plastic material of insulated characteristics; and preferably, for economy, there is molded of the same material, as an integral part of the plug, an elongated, leaf spring type latch member 52, which is of generally arcuate contour, as clearly seen in FIGURE 7. The material used preferably is resilient and capable of withstanding flexing and deformation. A satisfactory plastic material for this purpose is sold under the trademark "Cycloac." The ends of the resilient latch member terminate in flanged portions 54, which are adapted to move into the notch portions 24 of the base when the light unit is being mounted in operative position, as seen in FIGURE 7.

Mounted in each of the aligned sets comprising two pairs of spring fingers 44 of the two contact members, at opposite ends thereof, is an electric lamp bulb 56. These bulbs have a flattened base portion 58, and are provided with two spaced apart terminal wires 60, on each of the flat faces of the flattened base of the lamp bulb. The spacing of the wire 60 on each of the faces of the flattened base of the bulb is such that when the bulb is inserted into the socket formed by the two pairs of resilient fingers 44, each of the wires 60 on the respective faces makes electrical contact with one of the fingers. The purpose of the provision of conductor wires on opposite faces of the flattened base of the lamp is to insure the making of proper electrical connections for energizing the bulb. When the two lamp bulbs are mounted in their sockets, they extend toward each other at an oblique angle, as seen in FIGURE 7 of the drawing.

The free ends of the leg portions 42 of the contact members 38, terminate in outwardly extending contact lugs or prongs 42a, as seen in FIGURES 3, 6 and 8 of the drawings, and when the two contact members are positioned in cooperating relation in the mounting base 22, said contact lugs are located rearwardly of or beneath the base and extend in opposite, outwardly directions. The marginal edges of the contact lugs or prongs 42a are peened or reduced in thickness to provide a substantially knife-like edge.

When the contact members and lamp bulbs are operatively connected to the base, they are enclosed by a housing 62, which functions as a lens. The housing 62 is formed of suitable translucent plastic material and, as seen in the drawings, is generally, in outline form, a segment of a disc, including a main arcuate front wall 63, together with relatively flat top and bottom walls 64, all of which walls terminate in a generally rectangular shaped open end frame portion 65. The frame portion 65 of the housing is dimensioned for a snug, telescopic fit around the marginal edges of the base of the body member 22. Preferably, the housing and the base member 22 are adhesively connected together for permanency and for insuring the exclusion of moisture and foreign matter from entering the housing. The arcuate wall 63 of the housing on the inner surface thereof, as seen in FIGURE 6, is formed with two sets of light refracting surfaces, each comprising a multiplicity of closely spaced apart ribs 66, which extend throughout the major portion of the arcuate extent of said front wall 63. The inner surface of the top and bottom walls 64 of the housing are provided with a multiplicity of closely spaced apart ribs 67, constituting light refracting surfaces, and which extend from adjacent the arcuate wall to the rectangular frame portion 65.

Th light unit may be quickly and easily mounted in operative relation to the conductor strip by first placing the unit transversely of the strip so that the terminal lugs 42a of the contact members extend freely and are located between the flanges 16 and 17 of the strip, and the light unit is then rotated approximately 90° to the position seen in FIGURES 1 and 7 of the drawings, at which time the terminal contact lugs or prongs 42a move beneath the flanges 16 and 17 of the strip, into firm contacting engagement with the conductor wires 18 of the strip to complete the electrical circuit with the lamp bulbs 56. Preparatory to turning the unit to its operative position, pressure is exerted on the unit to compress the outer ends of the spring 52, and while turning said unit the outer ends register in the space between the flanges 16 and 17 of the strip, and then snap into said space to securely latch the light unit to the strip, and thereafter precluding turning of the light unit relative to the strip. When the light unit is properly mounted on the strip, it is not possible, even by means of tools, to practically compress the outer ends of the spring member 52 against the base 22 so that the light unit could be turned and removed from the strip. It is, therefore, apparent that the light unit, when once mounted in operative position on the strip, cannot be removed intact from the strip. In the event the light unit is to be removed, it must be partially destroyed, such as by first rupturing the housing 64, in order to gain access to the free ends of the spring 52 and to compress them against the base, and thereby permit turning of the remainder of the unit for removal from the strip.

Because of the extreme simplicity in construction of the lamp unit, which is composed of few parts and relatively inexpensive to manufacture and assemble, it is now possible when a light unit becomes inoperative, such as by damage or by burned out lamp bulbs, to totally discard and replace it by another unit.

The construction of the unit is such that inconvenience and delay in transit of road vehicles of the type above referred to, as a result of burn-out of or damage to one or more of the light units required under Interstate Commerce Commission regulations, is greatly minimized or eliminated. The driver of the vehicle, when it is noted that a light unit has become inoperative, may quickly and easily, without the use of tools, place another light unit in operative position immediately adjacent the inoperative one, and the inoperative light unit may be then or subsequently removed at the convenience of the operator of the vehicle.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim:

1. A permanent, pre-assembled light unit for use with a mounting having a pair of spaced apart conductor elements, said unit comprising a base of insulating material, a pair of spaced apart contact members carried on the base, a corresponding end portion of each of said members being formed to provide a pair of spaced apart, resilient fingers, the sets of fingers of the two members being cooperatively positioned to provide an elongated slot-type socket, a lamp bulb having a flattened base provided with two spaced apart terminals extending over opposite main surfaces of the lamp base, said lamp being mounted in the socket with the terminals thereof registering with the respective pairs of fingers of each of the contact members, and a housing of translucent material, connected to the base and enclosing the lamp bulb.

2. A permanent, pre-assembled light unit for use with a mounting having a pair of spaced apart conductor elements, said unit comprising a base of insulating material, a pair of spaced apart contact members carried on the base, a corresponding end portion of each of said members being formed to provide a pair of spaced apart, resilient fingers, the sets of fingers of the two members being cooperatively positioned to provide an elongated slot-type socket, a lamp bulb having a flattened base provided with two spaced apart terminals, said lamp being mounted in the socket with the terminals thereof registering with the fingers of the contact members, and a housing of translucent material, connected to the base and enclosing the lamp bulb.

3. A permanent, pre-assembled light unit for use with a mounting having a pair of spaced apart conductor elements, said unit comprising a base of insulating material, a pair of spaced apart contact members carried on the base, a corresponding end portion of each of said members being formed to provide a pair of spaced apart, resilient fingers, the sets of fingers of the two members being cooperatively positioned to provide an elongated slot-type socket, at least one of the contact members having a portion extending through the base for cooperative electrical engagement with one of the conductor elements, and a lamp bulb having a flattened base provided with two spaced apart terminals, said lamp being mounted in the socket with the terminals thereof registering with the fingers of the contact members, and a housing of translucent material, connected to the base and enclosing the lamp bulb.

4. A permanent, pre-assembled light unit for use with a mounting having a pair of spaced apart conductor elements, said unit comprising a flat base of insulating material and having an opening therethrough, a pair of spaced apart contact members seated on said base and each having a corresponding leg portion formed to provide a pair of spaced apart, resilient fingers, with the pair of fingers of the two legs aligned to form a slot-type socket, each of said members having a portion extending through the opening in the base and formed for cooperative engagement with one of the conductor elements, a plug mounted in said opening and firmly engaging and securing the contact members in position on the base, a lamp bulb having a flattened base provided with two spaced apart terminals on a main surface of the base, said lamp being mounted with its base seated between the two pairs of resilient fingers, and a housing of translucent material, connected to the base and enclosing the lamp bulb.

5. A permanent, pre-assembled light unit for use with a mounting having a pair of spaced apart conductor elements, said unit comprising a flat base of insulating material, a pair of identical contact members mounted in spaced apart relation on the base, said members being of generally T-shaped form and each having a pair of oppositely extending arms, the free ends of each of which terminate in pairs of spaced, resilient fingers, with the sets of fingers for each of the two members, at corresponding ends, being positioned in spaced, close, aligned relation to form slot-type sockets, the leg portion of each contact member being extended through the base and formed for cooperative engagement with said pair of conductor elements, a lamp bulb having a flattened base, mounted in each socket, the sockets being so formed and related to position said lamp bulbs so as to extend in opposite, inclined directions, and a housing of translucent material connected to the base and enclosing the lamp bulb.

6. A permanent, pre-assembled light unit for use with a mounting having a pair of spaced apart conductor elements, said unit comprising a flat base of insulating material, and having an opening extending therethrough, a pair of identical contact members mounted in spaced apart relation on the base, said members being of generally T-shaped form and each having a pair of oppositely extending arms, the free ends of each of which terminate in pairs of spaced, resilient fingers with the sets of fingers for each of the two members, at corresponding ends, being positioned in spaced, close, aligned relation to form slot-type sockets, the leg portion of each contact member being extended through the opening in the base and formed for cooperative engagement with said pair of conductor elements, a plug mounted in the opening in the base and firmly engaging and securing the contact members in position on the base, a lamp bulb having a flattened base, mounted in each socket, the sockets being so formed and related to position said lamp bulbs so as to extend in opposite, inclined directions, and a housing of translucent material, connected to the base and enclosing the lamp bulb.

7. A permanent, pre-assembled light unit for use with a mounting having a pair of spaced apart conductor elements, said unit comprising a flat base of insulating material and having an opening therethrough, a pair of spaced apart contact members seated on said base and each having a corresponding leg portion formed to provide a pair of spaced apart, resilient fingers, with the pair of fingers of the two legs aligned to form a slot-type socket, each of said members having a portion extending through the opening in the base and formed for cooperative engagement with one conductor element, a plug mounted in said opening and firmly engaging and securing the contact members in position on the base, a lamp bulb having a flattened base provided with two spaced apart terminals on a main surface of the base, said lamp being mounted with its base seated between the two pairs of resilient fingers, and an elongated, resilient latch member rigidly secured to said plug and positioned against the under side of the base for cooperating with the mounting to preclude turning of the lamp unit when operatively associated with said mounting.

8. A permanent, pre-assembled light unit for use with a mounting having a pair of spaced apart conductor elements, said unit comprising a flat base of insulating material and having an opening therethrough, a pair of spaced apart contact members seated on said base and each having a corresponding leg portion formed to provide a pair of spaced apart, resilient fingers, with the pair of fingers of the two legs aligned to form a slot-type socket, each of said members having a portion extending through the opening in the base and formed for cooperative engagement with one conductor element, a plug mounted in said opening and firmly engaging and securing the contact members in position on the base, a lamp bulb having a flattened base provided with two spaced apart terminals on a main surface of the base, said lamp being mounted with its base seated between the two pairs of resilient fingers, and an elongated, resilient latch member rigidly secured to said plug and positioned against the under side of the base for cooperating with the mounting to preclude turning of the lamp unit when operatively associated with said mounting, said plug and latch member being integrally formed of resilient, insulating, synthetic plastic material.

9. A permanent, preassembled light unit for use on the body of a road vehicle comprising a base, an electric lamp bulb mounted on the base, and a housing of translucent material, connected to the base and enclosing the lamp bulb, said housing having a main arcuate wall and relatively straight top and bottom walls, defining a rectangular form at the rear open side, the arcuate wall being formed with a plurality of closely spaced light reflecting surfaces extending in the direction of arcuate contour of said wall, and the top and bottom walls each being formed with a plurality of closely spaced light reflecting surfaces extending at right angles to the rear side of the housing.

References Cited in the file of this patent

UNITED STATES PATENTS

| | | |
|---|---|---|
| 1,617,474 | Alschuler | Feb. 15, 1927 |
| 2,232,276 | Schepmoes | Feb. 18, 1941 |
| 2,348,665 | Von Gehr | May 9, 1944 |
| 2,361,537 | Frank | Oct. 31, 1944 |
| 2,688,688 | Holtz | Sept. 7, 1954 |
| 3,005,089 | Robbins | Oct. 17, 1961 |
| 3,015,023 | Dayton et al. | Dec. 26, 1961 |